(12) United States Patent
Nomura et al.

(10) Patent No.: US 9,003,128 B2
(45) Date of Patent: Apr. 7, 2015

(54) CACHE SYSTEM AND PROCESSING APPARATUS

(75) Inventors: Kumiko Nomura, Tokyo (JP); Keiko Abe, Kanagawa-ken (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 80 days.

(21) Appl. No.: 13/234,837

(22) Filed: Sep. 16, 2011

(65) Prior Publication Data
US 2012/0246412 A1 Sep. 27, 2012

(30) Foreign Application Priority Data

Mar. 24, 2011 (JP) ................................ P2011-065271

(51) Int. Cl.
*G06F 12/00* (2006.01)
*G06F 12/08* (2006.01)
*G06F 12/12* (2006.01)

(52) U.S. Cl.
CPC .......... *G06F 12/0897* (2013.01); *G06F 12/123* (2013.01); *G06F 2212/225* (2013.01); *Y02B 60/1225* (2013.01)

(58) Field of Classification Search
USPC ........................... 711/103, 136, 113, 118, 160
See application file for complete search history.

(56) References Cited

U.S. PATENT DOCUMENTS

| | | | | |
|---|---|---|---|---|
| 4,168,541 A | * | 9/1979 | DeKarske | 365/49.17 |
| 4,437,155 A | * | 3/1984 | Sawyer et al. | 711/136 |
| 5,343,437 A | * | 8/1994 | Johnson et al. | 365/230.03 |
| 5,432,919 A | * | 7/1995 | Falcone et al. | 711/134 |
| 5,481,691 A | * | 1/1996 | Day et al. | 711/133 |
| 5,586,291 A | * | 12/1996 | Lasker et al. | 711/113 |
| 6,141,731 A | * | 10/2000 | Beardsley et al. | 711/136 |
| 6,480,929 B1 | * | 11/2002 | Gauthier et al. | 711/105 |
| 6,823,427 B1 | * | 11/2004 | Sander et al. | 711/136 |
| 7,093,089 B2 | | 8/2006 | De Brebisson | |
| 7,103,718 B2 | * | 9/2006 | Nickel et al. | 711/115 |
| 7,568,068 B2 | * | 7/2009 | Kulkarni et al. | 711/113 |
| 7,613,877 B2 | * | 11/2009 | Shimozono et al. | 711/113 |
| 7,822,932 B2 | * | 10/2010 | Fachan et al. | 711/162 |

(Continued)

FOREIGN PATENT DOCUMENTS

WO WO 2008/068797 6/2008

OTHER PUBLICATIONS

Notice of Reasons for Rejection issued by the Japanese Patent Office on May 23, 2014, for Japanese Patent Application No. 2011-065271, and English-language translation thereof.

*Primary Examiner* — Aimee Li
*Assistant Examiner* — Trang Ta
(74) *Attorney, Agent, or Firm* — Finnegan, Henderson, Farabow, Garrett & Dunner, L.L.P.

(57) ABSTRACT

According to an embodiment, in a cache system, the sequence storage stores sequence data in association with each piece of data to be stored in the volatile cache memory in accordance with the number of pieces of data stored in the nonvolatile cache memory that have been unused for a longer period of time than the data stored in the volatile cache memory or the number of pieces of data stored in the nonvolatile cache memory that have been unused for a shorter period of time than the data stored in the volatile cache memory. The controller causes the first piece of data to be stored in the nonvolatile cache memory in a case where it can be determined that the first piece of data has been unused for a shorter period of time than any piece of the data stored in the nonvolatile cache memory.

14 Claims, 10 Drawing Sheets

(56) References Cited

U.S. PATENT DOCUMENTS

| | | | |
|---|---|---|---|
| 7,882,305 B2* | 2/2011 | Moritoki | 711/113 |
| 8,065,496 B2* | 11/2011 | Okawa et al. | 711/160 |
| 8,341,382 B2* | 12/2012 | MacKenna et al. | 712/239 |
| 2004/0221108 A1* | 11/2004 | Bianchi et al. | 711/131 |
| 2005/0251617 A1* | 11/2005 | Sinclair et al. | 711/103 |
| 2007/0118695 A1* | 5/2007 | Lowe et al. | 711/136 |
| 2009/0164743 A1* | 6/2009 | Yoshii et al. | 711/162 |
| 2012/0221768 A1* | 8/2012 | Bagal et al. | 711/103 |

* cited by examiner

CACHE SYSTEM AND PROCESSING APPARATUS

CROSS REFERENCE TO RELATED APPLICATION

This application is based upon and claims the benefit of priority from the prior Japanese Patent Application No. P2011-065271, filed on Mar. 24, 2011, the entire contents of which are incorporated herein by reference.

FIELD

Embodiments described herein relate to a cache system and a processing apparatus.

BACKGROUND

Recently, an entire circuit system has been required to achieve lower power consumption. A processor portion in such circuit system is often not used even during the operation of the circuit system. Accordingly, reduction in the power consumption of the processor portion leads to reduction in the power consumption of the entire circuit system. Therefore, a method has been employed in which the power consumption of the processor portion is reduced by lowering an operation frequency when the processor is not used. However, with the method, operating power cannot be turned off even while the processor is in stand-by. Thus, further reduction in the power consumption is needed. Against the background, it is conceivable to configure a cache included in the processor with a nonvolatile memory and to disconnect the operating power to the processor portion while the processor is in stand-by. However, the performance of the processor is deteriorated because a write speed of a nonvolatile memory is slower than that of a volatile memory.

DETAILED DESCRIPTION

According to an embodiment, a cache system includes a volatile cache memory, a nonvolatile cache memory, a sequence storage, and a controller. The sequence storage stores sequence data in association with each piece of data to be stored in the volatile cache memory in accordance with the number of pieces of data stored in the nonvolatile cache memory that have been unused for a longer period of time than the data stored in the volatile cache memory or the number of pieces of data stored in the nonvolatile cache memory that have been unused for a shorter period of time than the data stored in the volatile cache memory. When a first piece of data stored in the volatile cache memory is overwritten by a second piece of data having another address, the controller causes the first piece of data to be stored in the nonvolatile cache memory in a case where it can be determined based on the sequence data stored in the sequence storage in association with the first piece of data that the first piece of data has been unused for a shorter period of time than any piece of the data stored in the nonvolatile cache memory.

In the following description, several embodiments will be further described by referring to the drawings. In the drawings, same reference numerals are given to denote same or similar portions.

A cache system and a processing apparatus according to a first embodiment are described by referring to the drawings. First of all, the details of making the invention are described. For example, let us suppose a cache system having a volatile memory and a nonvolatile memory whose capacity is larger than that of the volatile memory. It is assumed that these volatile memory and nonvolatile memory are both set associative caches, and have the same numbers of lines but have different numbers of ways. In this cache system, to suppress performance degradation due to a write speed of the nonvolatile memory, when a write request is received, writing is performed in the volatile memory. Then, when a reference request is received, data is read from either the volatile memory or the nonvolatile memory in which the corresponding data is stored.

There may be a case where there is no space on the lines of the volatile memory to which the data being the target of the write request should be written when the write request is made to the cache system. Therefore, in this case, data that has been unused for the longest period of time among the data stored in the volatile memory (hereinafter referred to as data A) is stored in the nonvolatile memory, and the data being the target of the write request is stored in the space of the volatile memory in which the data A is stored.

There may be a case where there is also no space on the same line of the nonvolatile memory when data is tried to be stored in the nonvolatile memory. In this case, it may be thought that the data A is used to overwrite the space in which the data that has been unused for the longest period of time (hereinafter referred to as data B) among the data stored in the nonvolatile memory, is stored. The data B stored in the nonvolatile memory may have been unused for a shorter period of time than the data A stored in the volatile memory.

Figure 10:
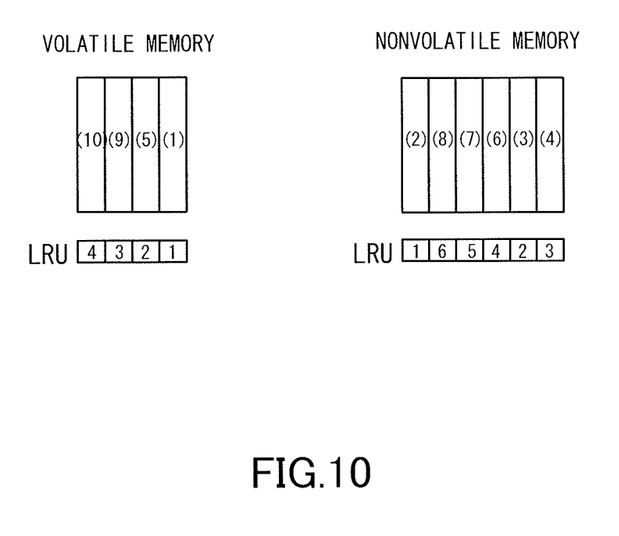
FIG. 10 is an example of data which is stored in an LRU memory in association with a four-way volatile memory and six-way nonvolatile memory of the cache without having a sequence storage.

FIG. 10 shows an example. FIG. 10 exemplifies same lines of the four-way volatile memory and the six-way nonvolatile memory. It is assumed here that as the number shown in each of the parentheses in FIG. 10 is larger, a period of time that the data has been unused is longer. As shown in FIG. 10, LRU (Least Recently Used) is stored in association with the ways of each of the volatile memory and the nonvolatile memory. Thus, when the LRU is confirmed, the order of the periods of time that the data stored in one line has been unused can be known for each of the volatile memory and the nonvolatile memory. However, in this cache system, it cannot be known that which of the data stored in the volatile memory and the data stored in the nonvolatile memory has been unused for a longer period of time.

When the cache system receives a write request with the LRU being stored as shown in FIG. 10, there is no space in the volatile memory. Accordingly, the data that has been unused for the longest period of time among the data stored in the volatile memory (the data shown by (10) in FIG. 10) is used to overwrite the data that has been unused for the longest period of time among the data stored in the nonvolatile memory (the data shown by (8) in FIG. 10. The period of time that the data has been unused is shorter than that of the data shown by (10)). In this manner, when the data stored in the nonvolatile memory is overwritten by the data stored in the volatile memory that has been unused for a longer period of time, the hit rate of the cache system is deteriorated. Thus, a longer time is required for processing. For this reason, in the following embodiment, a storage unit to store lengths of the periods of time that the data has been unused in comparison with the data stored in the nonvolatile memory in association with each piece of the data stored in the volatile memory is provided.

Figure 1:
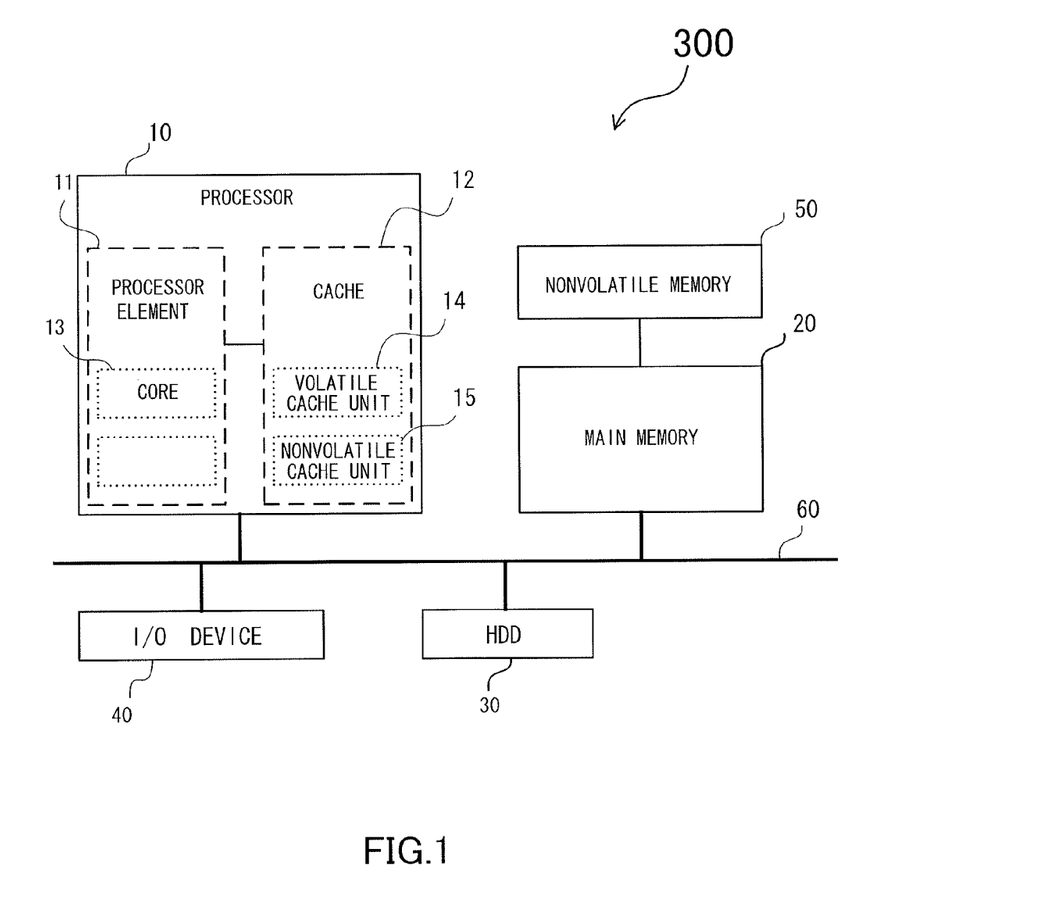
FIG. 1 is a block diagram showing the configuration of an information processing apparatus according to an embodiment.

FIG. 1 is a configuration diagram showing an information processing apparatus 300 according to the first embodiment. The information processing apparatus 300 may be a communication device, a PC, or a television, for example, in which a processor 10, a main memory 20, a hard disk 30, and an input/output device 40 are connected to each other through a bus 60. A nonvolatile memory 50 is connected to the main memory 20.

The processor 10 as a processing apparatus includes a processor element (PE) 11 and a cache 12. The processor element 11 includes a core 13 which performs an operation, a high-speed storage device called as an L1 cache, and the like. The processor 10 according to the embodiment reduces power consumption of the processor 10 by repeatedly turning on and off the power of the processor depending on the operating state of the processor 10.

The cache 12 as a cache system includes a volatile cache unit 14 having a volatile memory and a nonvolatile cache unit 15 having a nonvolatile memory. The cache 12 evacuates the data stored in the volatile memory in the volatile cache unit 14 to the nonvolatile memory in the nonvolatile cache unit 15 when the power of the processor is temporarily turned off, so that the data is prevented from being lost. Also, just after the power of the processor is turned on again, the cache 12 operates using the data saved in the nonvolatile memory in the nonvolatile cache unit 15. Note that in the following description, the volatile cache unit 14 and the nonvolatile cache unit 15 are both described as set associative caches.

Figure 2:
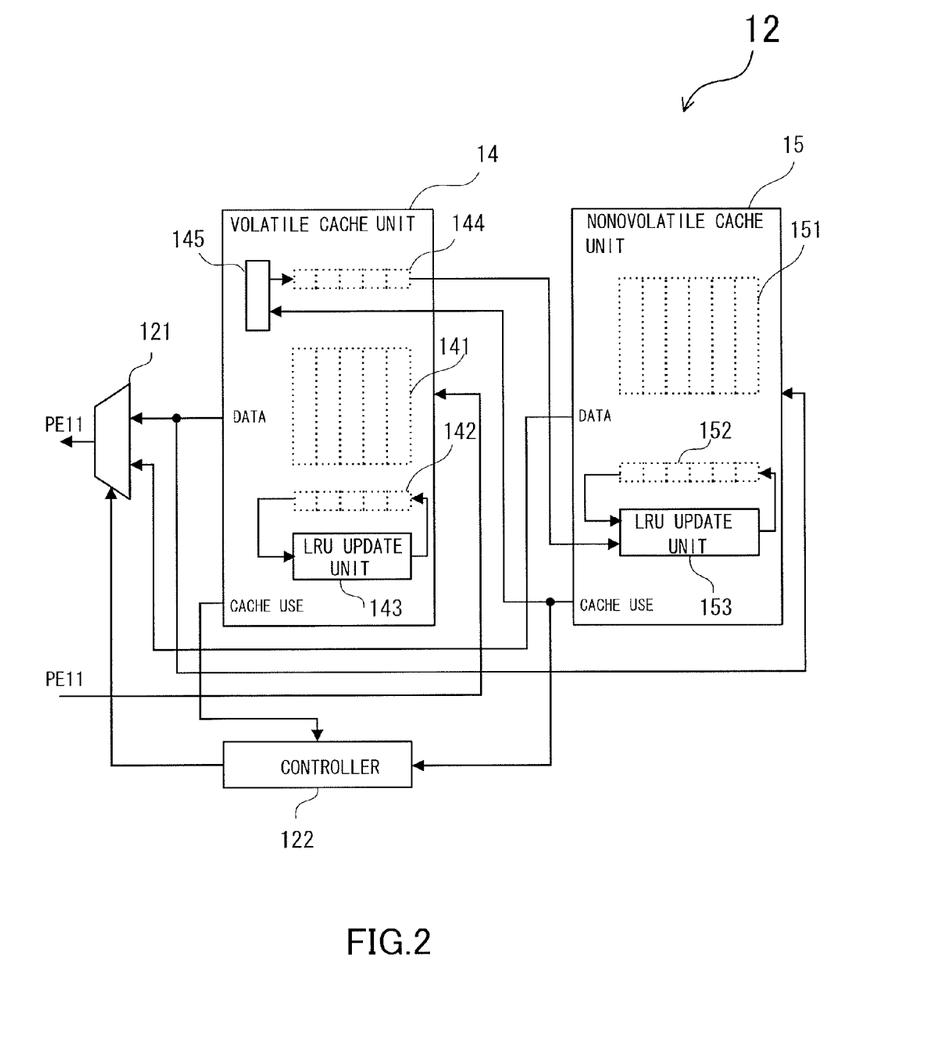
FIG. 2 is a block diagram showing the configuration of a cache of an information processing apparatus according to a first embodiment.

FIG. 2 is a block diagram showing the configuration of the cache 12. The cache 12 has a volatile cache unit 14, a nonvolatile cache unit 15, a multiplexer 121, and a controller 122.

The volatile cache unit 14 includes a volatile memory 141, an LRU memory 142, an LRU update unit 143, a sequence storage 144, and an update processing unit 145. The volatile memory 141 is a volatile cache memory. The nonvolatile memory 151 of the nonvolatile cache unit 15 is a nonvolatile cache memory.

The volatile memory 141 may be an SRAM (Static Random Access Memory) or the like, for example. The volatile memory 141 can store data being a target of a write request from the processor element 11 to the cache 12 or data which is fetched from an upper storage medium such as the main memory 20. For example, the data which is a target of a write request from the processor element 11 may be data which is used for operation processing in the processor element 11.

The LRU memory 142 stores, in association with each piece of the data stored in the volatile memory 141, LRU data showing the order of the lengths of the periods of time that the data has been unused, the order being among the data for the number of ways stored in the same line. In the following, the description is given of the case where each piece of the LRU data in the LRU memory 142 is given of numbers "1," "2," "3" ... sequentially from the data that has been unused for the shortest period of time. The LRU update unit 143 updates the LRU data stored in the LRU memory 142 when the data stored in the volatile memory 141 is referred or written.

The sequence storage 144 stores, in association with each piece of the data stored in the volatile memory 141, sequence data showing a relationship between a period of time that the data stored in the nonvolatile memory 151 of the nonvolatile cache unit 15 has been unused and a period of time that the data stored in the volatile memory 141 has been unused. Specifically, the sequence storage 144 stores sequence data that is used (referred) after each piece of the data stored in the volatile memory 141 is used (referred or written) in accordance with the number of pieces of the data stored in the nonvolatile memory 151.

The update processing unit 145 updates the sequence data stored in the sequence storage 144 in a case where the data stored in the volatile memory 141 is used and a case where a signal indicating that the data stored in the nonvolatile memory 151 is used is received from the nonvolatile cache unit 15.

The nonvolatile cache unit 15 includes a nonvolatile memory 151, an LRU memory 152, and an LRU update unit 153.

The nonvolatile memory 151 may be an MRAM (Magnetoresistive Random Access Memory), an FeRAM (Ferroelectric Random Access Memory), an ReRAM (Resistance Random Access Memory), a PRAM (Phase change RAM), or the like, for example. When the MRAM is used as the nonvolatile memory 151, as compared with the case where other nonvolatile memories are used, a resistance to rewrite is high and a write speed is fast. Also, when the FeRAM is used as the nonvolatile memory 151, the FeRAM has a substantially same level of resistance to rewrite as the MRAM and has a good compatibility with the well-known process of making an integrated circuit. Thus, the FeRAM is readily manufactured. The nonvolatile memory 151 has the same number of lines as the volatile memory 141 and has a larger number of ways than the volatile memory 141. The nonvolatile memory 151 can store data output from the volatile cache unit 14.

The LRU memory 152 stores, in association with each piece of the data stored in the nonvolatile memory 151, LRU data showing the order of the lengths of the periods of time that the data has been unused, the order being among the data for the number of ways stored in the same line. In the following, the description is given of the case where each piece of the LRU data stored in the LRU memory 152 is given of numbers "1," "2," "3," ... sequentially from the data that has been unused for the shortest period of time. The LRU update unit 153 updates the LRU data stored in the LRU memory 152 when the data stored in the nonvolatile memory 151 is referred or written.

The multiplexer 121 outputs any one of the data which is outputted from the volatile cache unit 14 and the data which is outputted from the nonvolatile cache unit 15 to the processor element 11 in accordance with the control of the controller 122.

The controller 122 controls the volatile cache unit 14 and the nonvolatile cache unit 15.

In addition, the controller 122 controls an output of the multiplexer 121 in accordance with an address-hit state which is acquired from the volatile cache unit 14 and the nonvolatile cache unit 15, and the type of request which is outputted from the processor element 11.

Figure 3:
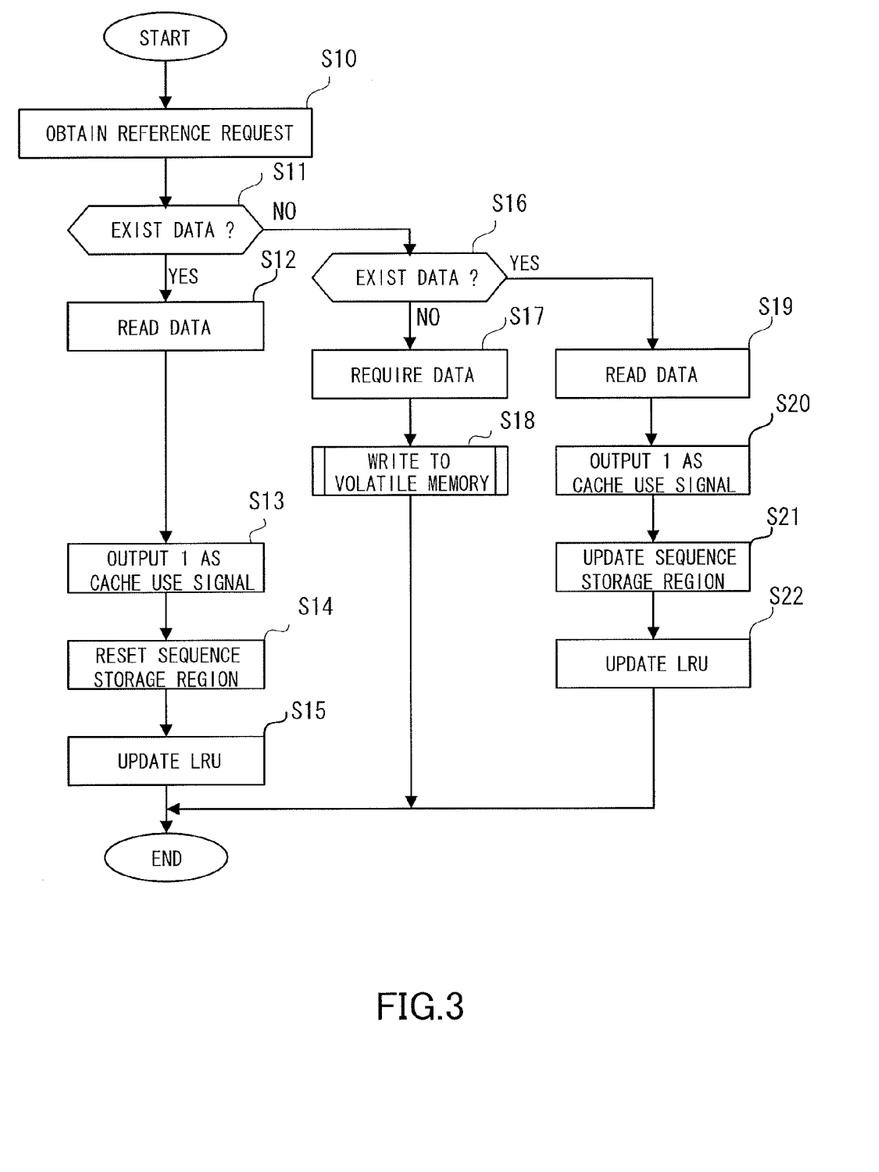
FIG. 3 is a flowchart showing a process to be performed when the cache of the information processing apparatus according to the first embodiment receives a reference request from a processor element.

FIG. 3 is a flowchart showing a process to be performed when the cache 12 receives a reference request from the processor element 11. When the cache 12 receives a reference request from the processor element 11 (S10), it is checked whether the data having the address to which the reference request is made exists in the volatile memory 141 (S11).

In the case that the corresponding data is stored in the volatile memory 141 (YES at S11), the data is read from the volatile memory 141 and is sent to the multiplexer 121 (S12). Then, a signal (CACHE USE signal "1") showing that the data in the volatile memory 141 is used is outputted from the volatile cache unit 14 to the controller 122 (S13). The controller 122 controls the multiplexer 121 based on the CACHE USE signal received from the volatile memory 141 and outputs the data read from the volatile memory 141 from the multiplexer 121.

Moreover, in the volatile cache unit 14, the update processing unit 145 resets the sequence data in the sequence storage 144 which corresponds to the referred data in the volatile memory 141 (S14). Note that, in the embodiment, the description is given of the case where to reset the sequence data means that "1" is set to the sequence data in the sequence storage 144.

Furthermore, the LRU update unit 143 updates the LRU data stored in the LRU memory 142 (S15). Specifically, the LRU data in the LRU memory 142 which corresponds to the data referred at step S12 is set to be data "1" showing that the data has been unused for the shortest period of time. As for other pieces of the LRU data stored in the LRU memory 142 other than the data 1, update is made in such a manner that data "2," "3," . . . are sequentially set from the data that has been unused for a shorter period of time based on the data before being updated.

On the other hand, there is a case where the corresponding data is not stored in the volatile memory 141 when the cache 12 receives a reference request from the processor element 11. When the corresponding data is not stored in the nonvolatile memory 151 either (NO at S16), the data is requested to an upper storage medium of the cache 12 (for example, the upper cache or the main memory 20) (S17). Then, the data which is acquired from the upper storage medium is written to the volatile memory 141 (S18). The process to write data to the volatile memory 141 is described later using FIG. 4.

There is a case where the corresponding data is not stored in the volatile memory 141 when the cache 12 receives a reference request from the processor element 11. When the corresponding data is stored in the nonvolatile memory 151, however (YES at S16), the corresponding data is read from the nonvolatile memory 151 and then the corresponding data is sent to the multiplexer 121 (S19). After that, a signal (CACHE USE signal "1") showing that the data in the nonvolatile memory 151 is used is sent from the nonvolatile cache unit 15 to the controller 122 and the volatile cache unit 14 (S20). At this time, the LRU data which is stored in the LRU memory 152 in association with the data read from the nonvolatile memory 151 is outputted to the volatile cache unit 14.

The controller 122 controls the multiplexer 121 based on the CACHE USE signal received from the nonvolatile memory 151. The controller 122 outputs the data read from the nonvolatile memory 151 from the multiplexer 121.

The volatile cache unit 14 receives the CACHE USE signal from the nonvolatile cache unit 15 and the LRU data stored in the LRU memory 152. In the volatile cache unit 14, the update processing unit 145 updates the sequence data stored in the sequence storage 144 (S21). Specifically, among each piece of the sequence data in the sequence storage 144 which is associated with the data in the volatile memory 141 in the same line as the line of the nonvolatile memory 151 in which a reference is made, 1 is added to the sequence data whose value is equal to or smaller than that of the LRU memory 152 which is associated with the data read from the nonvolatile memory 151.

The process at step S21 means as follows. It is assumed that the sequence data "X" stored in the sequence storage 144 is associated with the data read from the nonvolatile memory 151 and is equal to or smaller than the LRU data "Y" of the LRU memory 152. This means that the data read from the nonvolatile memory 151 which is associated with the LRU data "Y" has been unused for a longer period of time than the data stored in the volatile memory 141 in association with the sequence data "X" before step S19 is started. At step S19, the data in the nonvolatile memory 151 is referred and the period of time that the data has been unused becomes shorter than the data stored in the volatile memory 141. The sequence data in the sequence storage 144 shows the number of pieces of the data (in the embodiment, the number of ways) in the nonvolatile memory 151 that has been unused for a shorter period of time than the data in the volatile memory 141. Thus, 1 is added to the data of the LRU memory 152 which is associated with the data in the volatile memory 141.

The LRU update unit 153 of the nonvolatile cache unit 15 updates the LRU data stored in the LRU memory 152 (S22). Specifically, the LRU data in the LRU memory 152 which corresponds to the data referred at step S19 is set to be data "1" showing that the data has been unused for the shortest period of time. The LRU data in the LRU memory 152 other than the LRU data set to "1" is updated in such a manner that "2," "3," . . . are sequentially set from the data that has been unused for a shorter period of time based on the LRU data before being updated.

Figure 4:
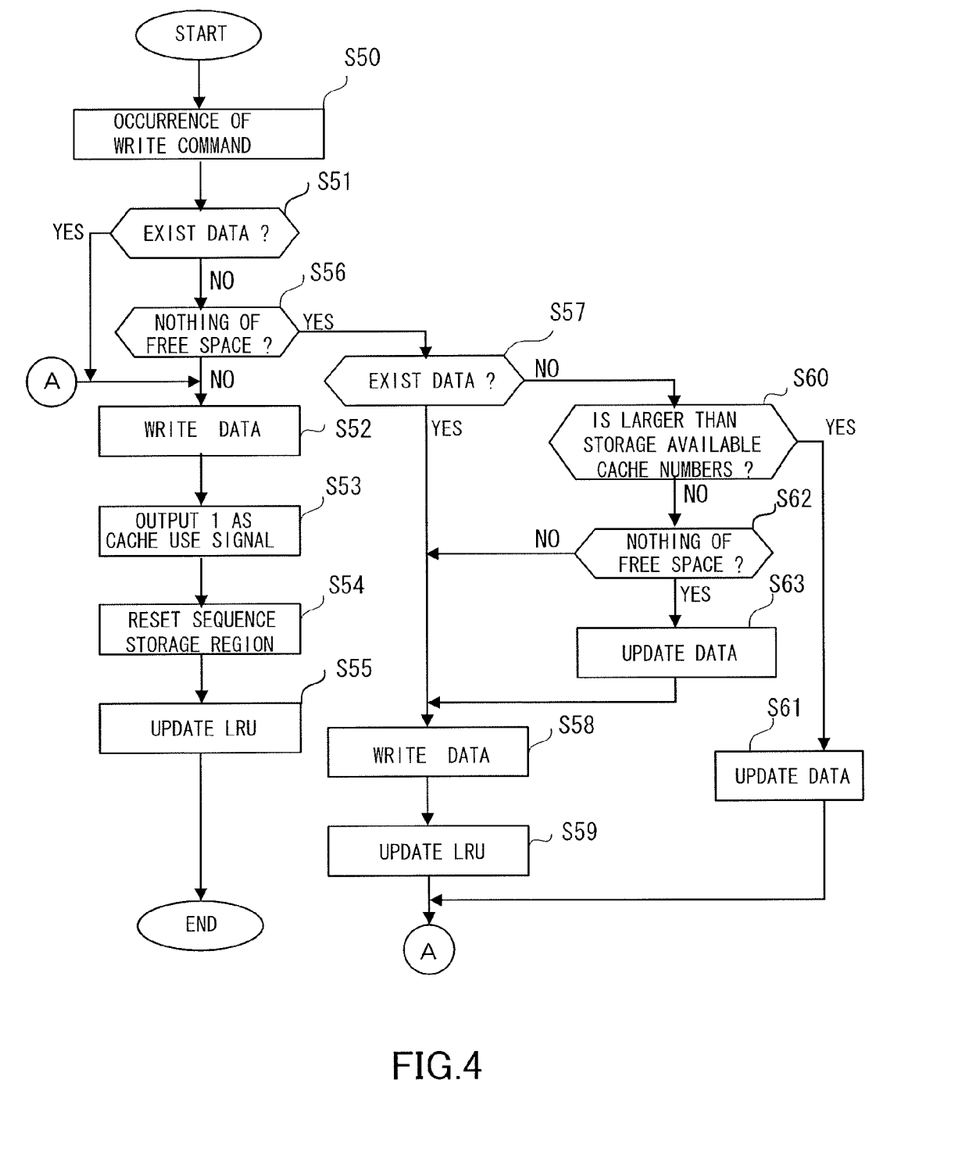
FIG. 4 is a flowchart showing a process to be performed when the cache of the information processing apparatus according to the first embodiment receives a write request to a volatile memory.

FIG. 4 is a flowchart showing a process to be performed when the cache 12 receives a write request to the volatile memory 141. The case where a write request to the volatile memory 141 occurs means a case where a write request is received from the processor element 11 or a case where, as described at step S18 in FIG. 3, the data in an upper storage medium is referred.

When the cache 12 receives a write request to the volatile memory 141 (S50), the volatile memory 141 is retrieved based on the address of the target data of the write request to determine whether the data having the address has been already stored in the volatile memory 141 (S51).

When the target data has been already stored in the volatile memory 141 (YES at step S51), the target data of the write request is written in the volatile memory 141 (S52). That is, when it is confirmed at step S51 that the data is stored in the volatile memory 141, the target data of the write request is used to overwrite the data in the volatile memory 141 which is retrieved at step S51.

Then, the volatile cache unit 14 outputs a signal (CACHE USE signal "1") showing that the data in the volatile memory 141 is used to the controller 122 (S53). The sequence data in the sequence storage 144 which corresponds to the data written in the volatile memory 141 is reset (S54).

Furthermore, the LRU update unit 143 updates the LRU data stored in the LRU memory 142 (S55). Specifically, the LRU data in the LRU memory 142 which corresponds to the data written at step S52 is set to be data "1" showing that the data has been unused for the shortest period of time. The LRU data in the LRU memory 142 other than the LRU data set to "1" is updated in such a manner that "2," "3," . . . are sequentially set from the data that has been unused for a shorter period of time based on the data before being updated.

Even when the data having the address identical to the target data of the write request is not stored in the volatile memory 141 upon receipt of a write request (NO at step S51), in the case that there is space in the volatile memory 141 (NO at step S56), the processes relating to write the data to the volatile memory 141 are performed as shown in steps S52 to S55. That is, even when the data having the address identical to the target data of the write request is not stored in the volatile memory 141, in the case that there is space in the volatile memory 141, the write destination of the data at step S52 is free space in the volatile memory 141.

Meanwhile, let us suppose a case when the data having the address identical to the target data of the write request is not stored in the volatile memory 141 upon receipt of a write request (NO at step S51), and there is no space in the volatile memory 141 (YES at S56). When the required data is written in the volatile memory 141, any piece of the data which has been already stored in the volatile memory 141 is overwritten in this case. For this reason, the processes at steps S57 to S63 are performed before the processes of writing the data to the volatile memory 141 are performed at steps S52 to S55.

At step S57, it is checked whether the nonvolatile memory 151 stores the data having the address identical to the data that has been unused for the longest period of time (referred to as data A) among the data stored in the volatile memory 141. When the data having the address identical to the data A is stored in the nonvolatile memory 151 (YES at step S57), the data A is written in the nonvolatile memory 151 (S58). Note that in the case where the data having the address identical to the data A is stored in the nonvolatile memory 151 as described above, the data is overwritten by the data A.

After that, the LRU update unit 153 updates the LRU data stored in the LRU memory 152 (S59). At this time, the LRU data stored in the LRU memory 152 is updated using the sequence data which is stored in the sequence storage 144 in association with the data A. In other words, the LRU data in the LRU memory 152 which corresponds to the data written at step S58 is updated with the sequence data which is stored in the sequence storage 144 in association with the data A and "1" is added to the specified LRU data stored in the LRU memory 152. The specified LRU data is equal to or larger than the sequence data which is stored in the sequence storage 144 in association with the data A. Note that in the method of updating the LRU memory 152, the sequence data stored in the sequence storage 144 and an initial value of the LRU data stored in the LRU memory 152 use the same number. Thus, the LRU data stored in the LRU memory 152 which corresponds to the data written at step S58 is used as a sequence data which is stored in the sequence storage 144 in association with the data A. However, even when the initial values are different from each other, the LRU data stored in the LRU memory 152 can be updated based on the sequence data which is stored in the sequence storage 144 in association with the data A.

As described above, the processes to write data to the volatile memory 141 are performed at steps S52 to S55 after the write process to the nonvolatile memory 151 is performed. Note that, when the process to write the data to the volatile memory 141 is performed at step S52 after steps S58 and S59 are finished, the target data of the write request to volatile memory 141 is used to overwrite the data A stored in the nonvolatile memory 151.

On the other hand, at step S57, in the case where the nonvolatile memory 151 does not store the data having the address identical to the data A, when the data A is written in the nonvolatile memory 151, there is a possibility that any piece of the data which has been already stored in the nonvolatile memory 151 is overwritten. For this reason, the processes at steps S60 to S63 are performed.

At step S60, it is determined whether the sequence data stored in the sequence storage 144 in association with the data A is larger than the number of cache data capable of being stored in the nonvolatile memory 151. As described above, each piece of the sequence data which is stored in the sequence storage 144 in association with the each piece of the data in the volatile memory 141 is reset when the data in the volatile memory 141 is referred or written. Also, when the data in the nonvolatile memory 151 that has been unused for a longer period of time than the data in the volatile memory 141 is referred, 1 is added to the sequence data which is stored in the sequence storage 144 in association with the data in the volatile memory 141. In other words, the sequence data in the sequence storage 144 is the number which is obtained by adding the number of pieces of the data in the nonvolatile memory 151 that has been unused for a shorter period of time than the corresponding data in the volatile memory 141 to the initial value of the sequence data in the sequence storage 144.

Accordingly, in the case that it is assumed that the initial sequence data of the sequence storage 144 is 1, when the sequence data stored in the sequence storage 144 is larger than the number of pieces of cache data capable of being stored in the nonvolatile memory 151, the data which is stored in the volatile memory 141 in association with the sequence data stored in the sequence storage 144 has been unused for a longer period of time than any piece of the data in the nonvolatile memory 151.

For this reason, in the case where the sequence data stored in the sequence storage 144 in association with the data A is larger than the number of the pieces of the cache data capable of being stored in the nonvolatile memory 151 (YES at S60), data in an upper storage medium of the cache 12 (such as upper cache or main memory 20) is updated using the data A without storing the data A in the nonvolatile memory 151 (S61). After that, at step S52, the target data of the write request is written to space in the volatile memory 141 in which the data A is stored, and the processes at steps S53 and S54 are performed.

In the case that the sequence data stored in the sequence storage 144 in association with the data A is smaller than the number of cache data capable of being stored in the nonvolatile memory 151 at step S60, the data A has been unused for a shorter period of time than the data that has been unused for the longest period of time among the data stored in the nonvolatile memory 151. Thus, the data A is stored in the nonvolatile memory 151. At this time, when there is space in the nonvolatile memory 151 (NO at step S62), the data A outputted from the volatile memory 141 is stored in free space in the nonvolatile memory 151 (S58). The LRU update unit 153 updates the LRU data stored in the LRU memory 152 (S59). In other words, the LRU data in the LRU memory 152 which corresponds to the data written at step S58 is updated with the sequence data stored in the sequence storage 144 in association with the data A, and then 1 is added to the specified LRU data stored in the LRU memory 152, the specified LRU data is equal to or larger than the value stored in the sequence storage 144 in association with the data A.

On the other hand, at step 62, in a case where it is confirmed that there is no space in the nonvolatile memory 151 (YES at step S62), the LRU data stored in the LRU memory 152 is used to identify the data that has been unused for the longest period of time (referred to as data B) among the data stored in the nonvolatile memory 151. The data in the upper storage medium of the cache 12 (such as an upper cache or the main memory 20) is updated using the data B (S63). After that, the data A outputted from the volatile memory 141 is stored in the space in the nonvolatile memory 151 in which the data B is stored (S58). The LRU update unit 153 updates the LRU data stored in the LRU memory 152 (S59). Then, at step S52, the target data of the write request is written to the space in the volatile memory 141 in which the data A is stored and the processes at steps S53 to S55 are performed.

As described above, the sequence storage 144 is provided, the sequence storage 144 stores sequence data for each piece of the data in the volatile memory 141 in accordance with the number of times that any piece of the data stored in the nonvolatile memory 151 is used after each piece of the data in the volatile memory 141 is used last time. Then, when any piece of the data stored in the volatile memory 141 is caused to be incapable of being read from the volatile memory 141 (for example, the data is overwritten by data having a different address), it is determined by using the sequence data stored in the sequence storage 144 whether the data which is caused to be incapable of being read from the volatile memory 141 needs to be copied to the nonvolatile memory 151.

Figure 5:
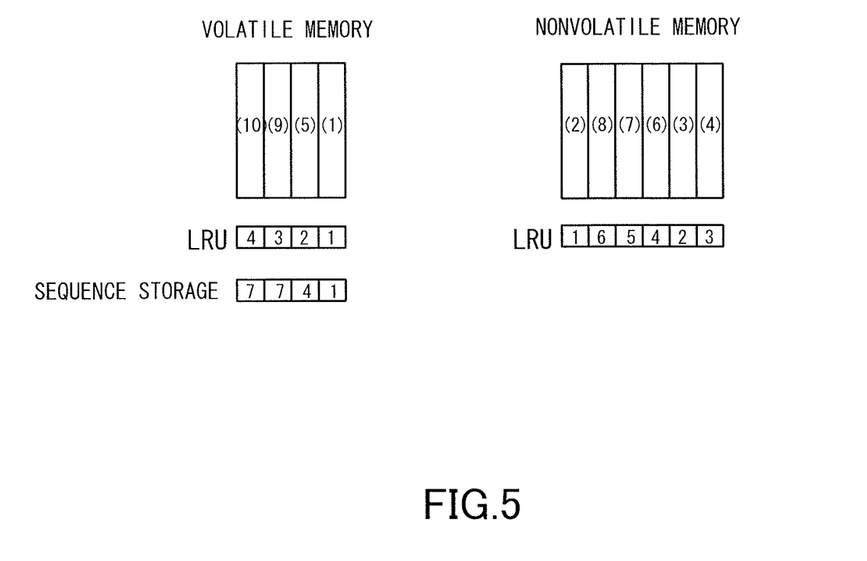
FIG. 5 is an example of data which is stored in an LRU storage unit and sequence storage of the cache of the information processing apparatus according to the first embodiment.

For example, it is assumed that as shown in FIG. 5, data is sequentially used from one having a larger number in parentheses for the four-way volatile memory and the six-way nonvolatile memory. At this time, it can be determined that data whose sequence data in the sequence storage 144 in association with the data in the volatile memory 141 is "7," which is larger than the number of ways of the nonvolatile memory 151, which is "6," has been unused for a longer period of time than any piece of the data stored in the nonvolatile memory 151. As described above, sequence data to be stored in the sequence storage is used, so that the data stored in the nonvolatile memory 151 can be prevented from being overwritten by the data stored in the volatile memory 141 that has been unused for a longer period of time. Accordingly, the hit ratio of the cache 12 can be prevented from being decreased.

Figure 6:
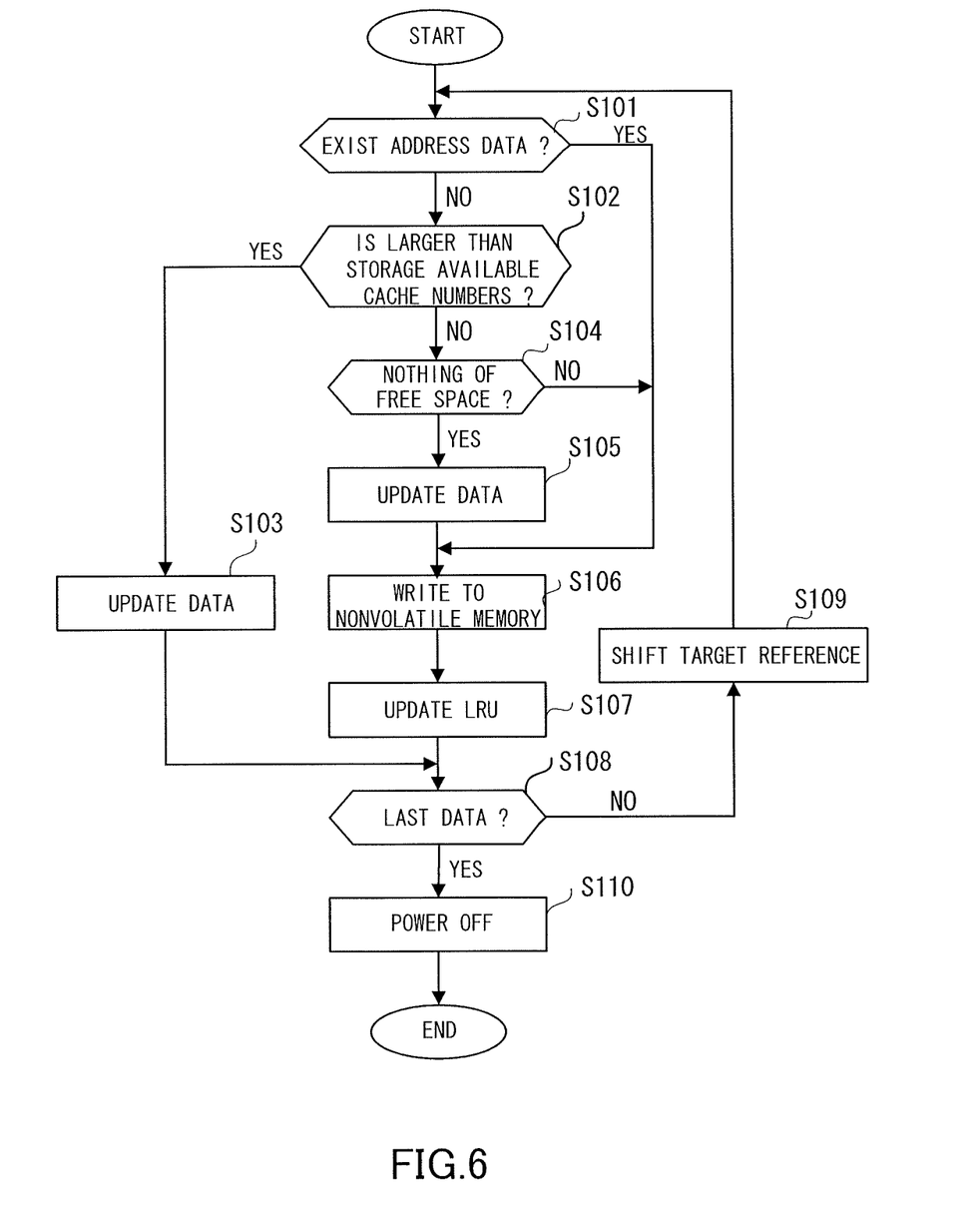
FIG. 6 is a flowchart showing a process of the cache to be performed when power of a processor of the information processing apparatus according to the first embodiment is turned off.

Next, referring to FIG. 6, the description is given of the process performed by the cache 12 when power of the processor 10 is turned off. When the power of the processor 10 is turned off, the data stored in the volatile memory 141 is erased. For this reason, the data stored in the volatile memory 141 is stored in the nonvolatile memory 151 or an upper storage device.

First of all, it is checked with any piece of the data in the volatile memory 141 being referred whether the data having the address identical to the data referred exists in the nonvolatile memory 151 (S101). When the corresponding data exists in the nonvolatile memory 151 (YES at step S101), the data in the nonvolatile memory 151 is overwritten by the referred data in the volatile memory 141 (S106). Then, the LRU update unit 153 updates the LRU data in the LRU memory 152 (S107). At this time, the LRU memory 152 is updated by using the sequence data stored in the sequence storage 144 in association with the referred data in the volatile memory 141. In other words, the LRU data in the LRU memory 152 which corresponds to the data written at step S106 is updated with the sequence data which is stored in the sequence storage 144 in association with the referred data in the volatile memory 141. Then, 1 is added to the specified LRU data which is stored in the LRU storage unit 152. The specified LRU data is equal to or larger than the sequence data stored in the sequence storage 144.

In a case where it is determined at step S101 that there is no data in the nonvolatile memory 151 which has the address identical to the referred data in the volatile memory 141 (NO at step S101), the sequence data stored in the sequence storage 144 in association with the referred data is read. After that, it is determined whether the read sequence data is larger than the number of pieces of the data capable of being stored in the nonvolatile memory 151 (S102).

In a case where the sequence data stored in the sequence storage 144 is larger than the number of pieces of the data capable of being stored in the nonvolatile memory 151 (YES at step S102), the referred data in the volatile memory 141 is the data that has been unused for the longest period of time than any piece of the data stored in the nonvolatile memory 151.

Thus, the referred data in the volatile memory 141 is stored in the upper storage medium such as the main memory 20 (S103).

Meanwhile, let us suppose a case where the sequence data stored in the sequence storage 144 is equal to or less than the number of pieces of the data capable of being stored in the nonvolatile memory 151 (NO at step S102). When there is space in the nonvolatile memory 151 (NO at step S104), the data is written in free space of the nonvolatile memory 151 (S106). After that, as described above, the LRU update unit 153 updates the LRU data in the LRU memory 152 (S107).

On the other hand, in the case that it is determined that there is no space in the nonvolatile memory 151 at step S104 (YES at step S104), the data that has been unused for the longest period of time among the data stored in the nonvolatile memory 151 is selected. The selected data is stored in the upper storage medium (S105). The data in the volatile memory is written on the data (S106). After that, as described above, the LRU update unit 153 updates the LRU data in the LRU memory 152 (S107).

When the process at step S103 or step S107 is finished, it is determined whether all pieces of the data in the volatile memory 141 have been already referred (S108).

In the case that all the pieces of the data in the volatile memory 141 have not been referred yet (NO at S108), a reference target is shifted to the next data in the volatile memory 141 (S109). Then, the processes at steps S101 to S108 are performed. When the reference on all the pieces of the data in the volatile memory 141 is finished at step S108 (YES at S108), the power of the cache 12 is turned off (S110).

As described above, when the power of the processor 10 is turned off, the data among the data stored in the volatile memory 141 that has been unused for a shorter period of time than the data in the nonvolatile memory 151 is stored in the nonvolatile memory 151. Accordingly, when the power of the processor 10 is turned on the next time, a decrease of the hit ratio of the cache 12 can be suppressed.

Figure 7:
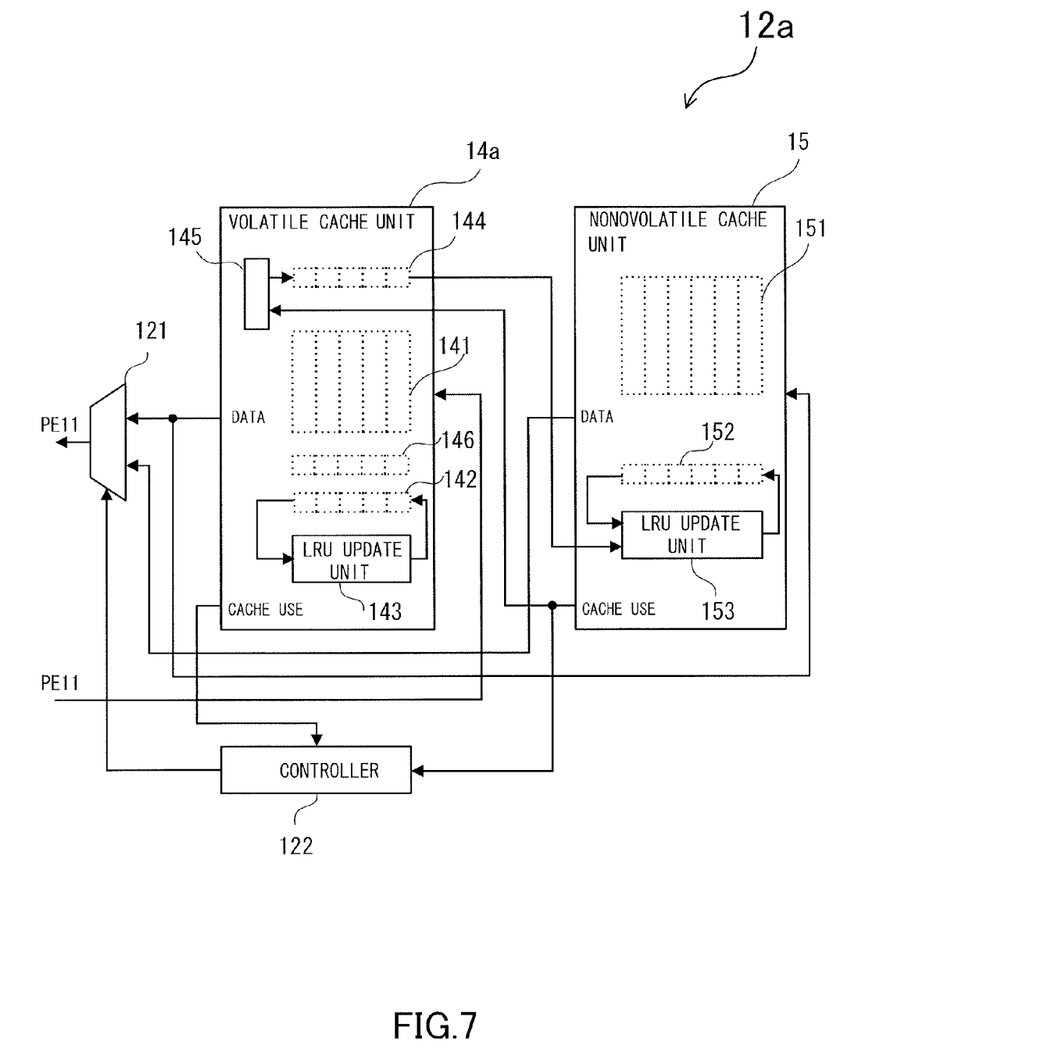
FIG. 7 is a block diagram showing a cache of an information processing apparatus according to a second embodiment.

FIG. 7 is a block diagram showing a cache of an information processing apparatus according to a second embodiment. In FIG. 7, same reference numerals are given to denote components identical to those of the cache 12 shown in FIG. 2, and the duplicated description is omitted.

A volatile cache unit 14a in a cache 12a shown in FIG. 7 has an already-copied storage 146. In normal operation, a request made from the processor element 11 for the cache 12a does not always occur. A case where a request frequently occurs and a case where a request does not occur are alternately generated. For this reason, when a request does not occur, the data stored in the volatile memory 141 is copied in the nonvolatile memory 151 within the cache 12a.

The already-copied storage 146 stores a flag showing whether the data has been already copied in the nonvolatile memory 151 for each piece of the data in the volatile memory 141. When the data in the volatile memory 141 is copied in the nonvolatile memory 151, the flag stored in the already-copied storage 146 is changed to a flag showing that the data stored in the already-copied storage 146 in association with the copied data has been already copied.

In addition, when the data acquired from the upper storage device such as the main memory 20 and the target data of a write request from the processor element 11 are written in the volatile memory 141, the data which is stored in the already-copied storage 146 corresponding to the written data is reset.

A value of the already-copied storage 146 which is set as described above is used to determine whether the process to copy the data stored in the volatile memory 141 to the nonvolatile memory 151 when a situation where the data stored in the volatile memory 141 is erased occurs.

A flow of the process performed when the cache 12a according to the second embodiment receives a reference request from the processor element 11 is similar to that described with regard to the cache 12 according to the first embodiment (see, FIG. 3).

Figure 8:
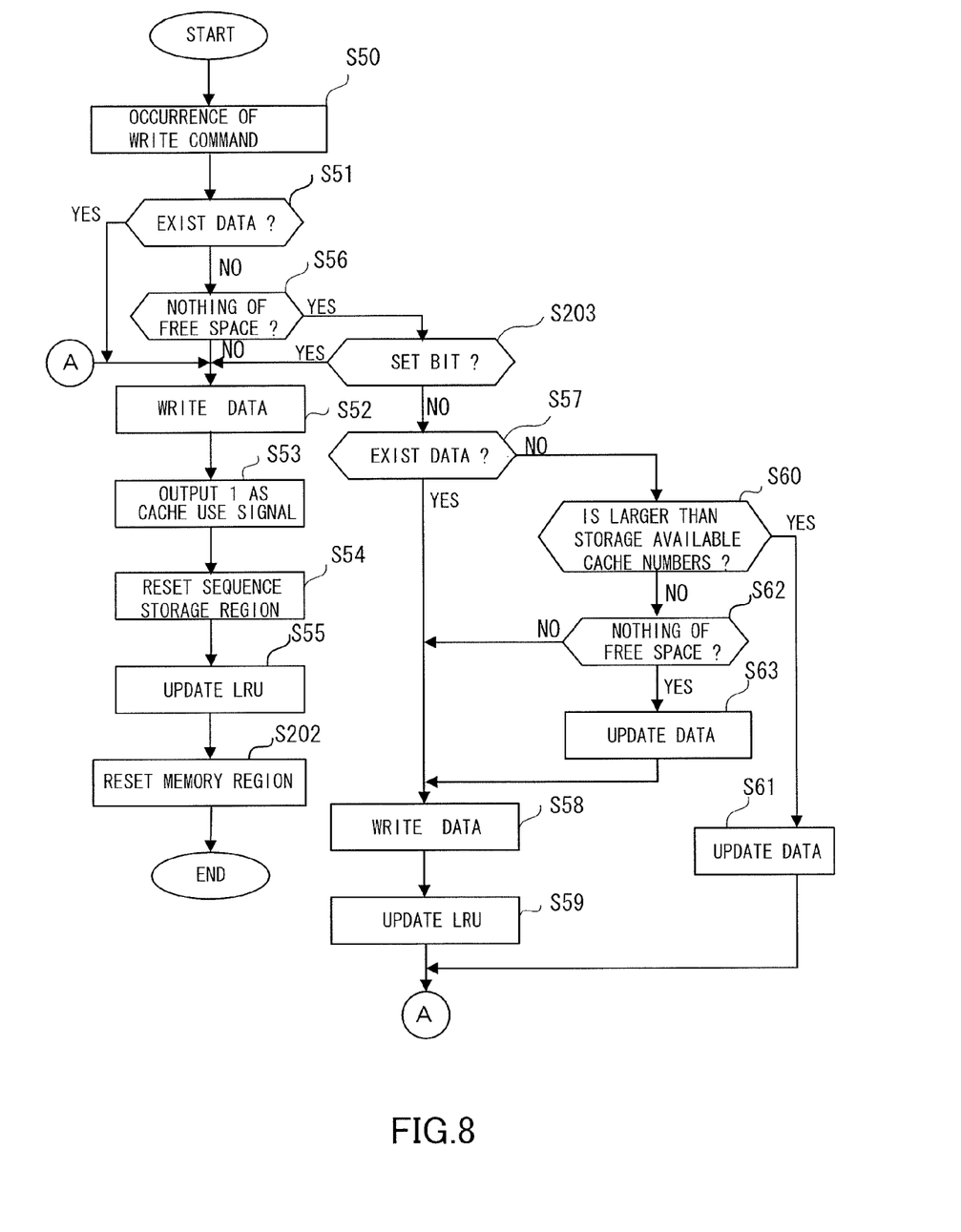
FIG. 8 is a flowchart showing a process to be performed when the cache of the information processing apparatus according to the second embodiment receives a write request to a volatile memory.

FIG. 8 is a flowchart showing a process to be performed when the cache 12a receives a write request to the volatile memory 141. In FIG. 8, same reference numerals are given to denote steps identical to those in FIG. 4. In a case where a write request to the volatile memory 141 is made but the data having the address identical to the target data is not stored in the volatile memory 141 (NO at step S51), when there is no space in the volatile memory 141 (YES at step S56), data A which has been unused for the longest period of time among the data stored in the volatile memory 141 is selected. Then, when the flag stored in the already-copied storage 146 in association with the selected data A is a flag showing that the data has been already copied (YES at step S203), there is no need to perform another process to store the data A in the nonvolatile memory 151 or the upper storage medium. Thus, the processes at steps S52 to S202 are performed. On the other hand, when the flag stored in the already-copied storage 146 in association with the selected data A is not a flag showing that the data has been already copied (NO at step S203), the processes at steps S57 to S61 are performed before the processes at steps S52 to S202 are performed.

Figure 9:
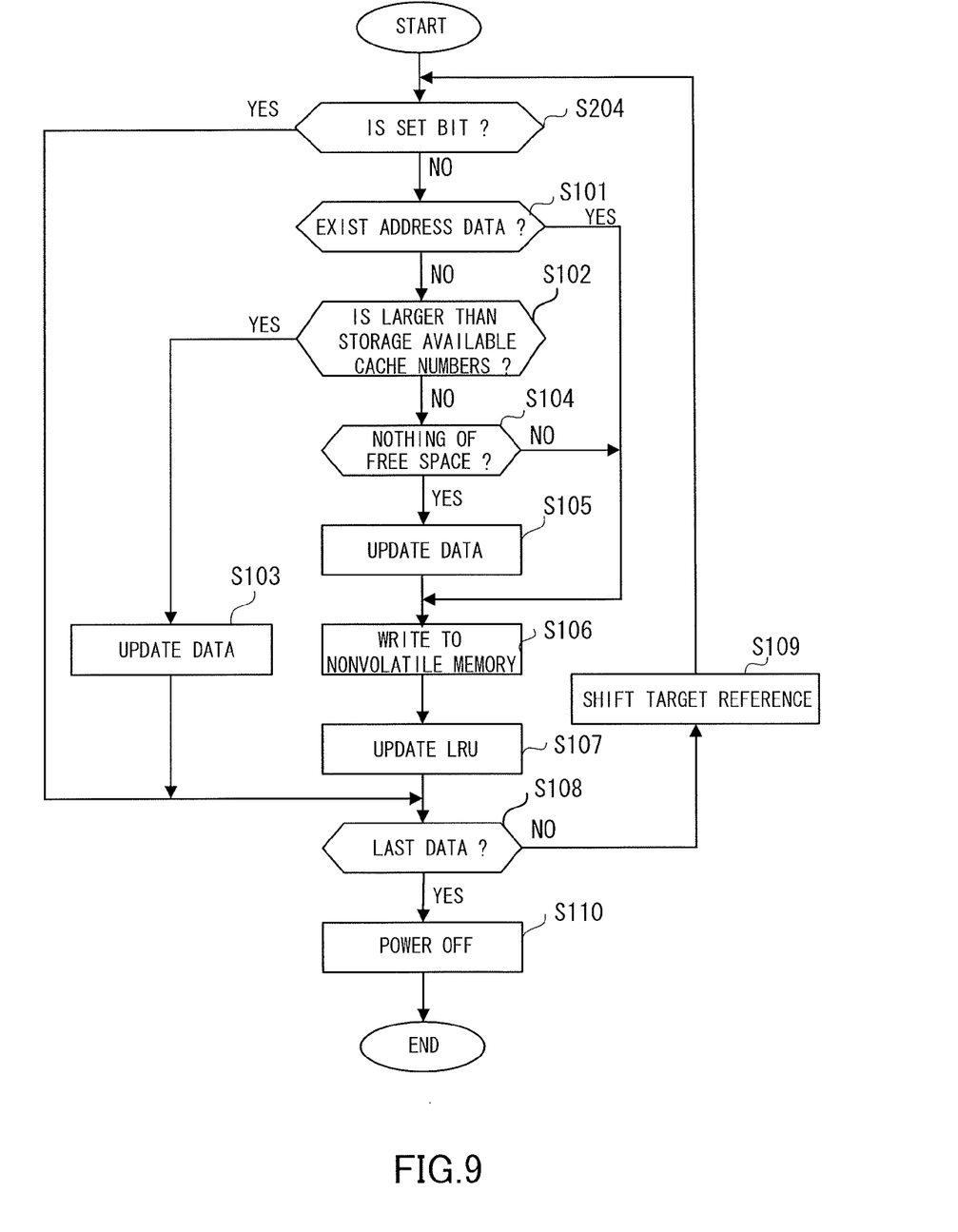
FIG. 9 is a flowchart showing a process of the cache to be performed when power of a processor of the information processing apparatus according to the second embodiment is turned off.

FIG. 9 is a flowchart showing a process of the cache 12a to be performed when power of the processor 10 is turned off. In FIG. 9, same reference numerals are given to denote steps identical to those in FIG. 6. In the cache 12a, when the flag stored in the already-copied storage 146 in association with the data in the volatile memory 141 is a flag showing that the data has been already copied (YES at step S204), the processes at steps S101 to S107 are not performed but a reference target is shifted to the next data (S109) or the power of the cache 12a is turned off (S110).

The data stored in the volatile memory 141 is copied in the nonvolatile memory 151 within the cache 12a when a request from the processor element 11 does not occur, and a flag showing whether the data in the volatile memory 141 has been already copied in the nonvolatile memory 151 is provided. As a result, a frequency of coping the data from the volatile memory 141 to the nonvolatile memory 151 when a request from the processor element 11 occurs is decreased. Thus, the processing time can be shortened. In addition, an execution time needed to turn off the power of the processor 10 is shortened. Consequently, it is made possible to reduce the power consumption by securing a longer power gating time.

The invention is not limited to the above-described embodiments and modifications of the embodiments and may be changed if needed without departing from the scope of the invention.

For example, in the above-described embodiment, the description is given of the case where the capacity of the volatile memory is smaller than that of the nonvolatile memory. However, the capacities of both memories may be same or may be such that the capacity of the nonvolatile memory is smaller than that of the volatile memory.

In addition, in the above-described embodiment, the description is given of the case where the cache is a set associative cache. However, the invention can be applied to a cache in a fully-associative method or a direct mapped method.

Moreover, in the above-described embodiment, the description is given of the case where the sequence data in the sequence storage 144 shows the number of pieces of the data in the nonvolatile memory 151, the data having been unused for a shorter period of time than the data in the volatile memory 141. However, the sequence data in the sequence storage 144 may show the number of pieces of the data in the nonvolatile memory 151, the data having been unused for a longer period of time than the data in the volatile memory 141. For example, this type of cache system can be achieved in such a manner that an initial value of the sequence storage is used to show the number of pieces of the data capable of being stored in the nonvolatile memory 151, and 1 is subtracted from the sequence data in the sequence storage when the data in the nonvolatile memory that has been unused for a longer period of time than the data in the volatile memory 141 is referred. In the cache system, as long as the sequence data in the sequence storage is 1 or larger, the data in the volatile memory 141 can be stored in the nonvolatile memory 151.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processor cache system, comprising:
a volatile cache memory included in a processor cache;
a nonvolatile cache memory included in the processor cache;
a sequence storage to store sequence data in association with each piece of data stored in the volatile cache memory, the sequence data representing the number of pieces of data stored in the nonvolatile cache memory and unused for a longer period of time than the piece of data stored in the volatile cache memory, or the number of pieces of data stored in the nonvolatile cache memory and unused for a shorter period of time than the piece of data stored in the volatile cache memory; and a controller to cause a first piece of data stored in the volatile cache memory to be stored in the nonvolatile cache memory when the first piece of data is overwritten by a second piece of data having another address or when power of the volatile cache memory is turned off, in a case where it is determinable based on the stored sequence data associated with the first piece of data that the first piece of data has been unused for a shorter period of time than any pieces of the data stored in the nonvolatile cache memory, or when the power of the volatile cache memory is turned off;

wherein:

line numbers of the volatile cache memory are equal to line numbers of a first LRU memory, line numbers of the nonvolatile cache memory are equal to line numbers of a second LRU memory, when the first piece of data is written in the cache system, the first piece of data is written in the volatile cache memory, when the second piece of data is stored in the volatile cache memory based on a read request, the second piece of data is read from the volatile cache memory, and when the second piece of data is only stored in the nonvolatile cache memory based on the read request, the second piece of data is read from the nonvolatile cache memory.

2. The cache system according to claim 1, wherein:

the second LRU memory stores, in association with each piece of the data stored in the nonvolatile cache memory, LRU data showing the order of lengths of the periods of time that the data has been unused, the order being among the data corresponding to a number of ways stored in the same line of the nonvolatile cache memory; and the system further comprises an LRU update unit to update the LRU memory using the sequence data stored in the sequence storage in association with the first piece of data, when the controller causes the first piece of data to be stored in the nonvolatile cache memory.

3. The cache system according to claim 2, further comprising an update processing unit to update, when any piece of the data in the nonvolatile cache memory is used, a sequence data stored in the sequence storage by using the LRU data stored in the second LRU memory in association with the piece of data in the nonvolatile cache memory.

4. The cache system according to claim wherein the controller causes the first piece of data to be stored not in the nonvolatile cache memory but in an upper storage device when the first piece of data stored in the volatile cache memory is overwritten by the second piece of data having another address or when power of the volatile cache memory is turned off, in a case where it is determinable based on the sequence data stored in the sequence storage in association with the first piece of data that the first piece of data has been unused for a longer period of time than all pieces of the data stored in the nonvolatile cache memory.

5. The cache system according to claim 1, further comprising an already-copied storage to store copy information showing whether data identical to each piece of data in the volatile cache memory has been stored in the nonvolatile cache memory, in association with the piece of the data, wherein the controller causes the first piece of data to be stored in the nonvolatile cache memory when the first piece of data stored in the volatile cache memory is overwritten by second piece of data having another address or when power of the volatile cache memory is turned off, in a case where copy information has been stored which shows that data identical to the first piece of data has not been stored in the nonvolatile cache memory, in association with the first piece of data, when it is determinable based on the sequence data stored in the sequence storage in association with the first piece of data that the first piece of data has been unused for a shorter period of time than any pieces of the data stored in the nonvolatile cache memory.

6. The cache system according to claim 1, wherein a number of lines of the volatile cache memory and a number of lines of the nonvolatile cache memory are equal to each other.

7. The cache system according to claim 1, wherein the nonvolatile cache memory is a magnetoresistive memory.

8. A processing apparatus, comprising a processor cache system and a processor element, wherein the cache system comprises:

a volatile cache memory included in a processor cache;

a nonvolatile cache memory included in the processor cache;

a sequence storage to store sequence data in association with each piece of data stored in the volatile cache memory, the sequence data representing the number of pieces of data stored in the nonvolatile cache memory and unused for a longer period of time than the piece of data stored in the volatile cache memory, or the number of pieces of data stored in the nonvolatile cache memory and unused for a shorter period of time than the piece of data stored in the volatile cache memory; and a controller to cause a first piece of data stored in the volatile cache memory to be stored in the nonvolatile cache memory when the first piece of data is overwritten by a second piece of data having another address or when power of the volatile cache memory is turned off, in a case where it is determinable based on the stored sequence data associated with the first piece of data that the first piece of data has been unused for a shorter period of time than any pieces of the data stored in the nonvolatile cache memory, or when the power of the volatile cache memory is turned off;

wherein:

line numbers of the volatile cache memory are equal to line numbers of a first LRU memory, line numbers of the nonvolatile cache memory are equal to line numbers of a second LRU memory, when the first piece of data is written in the cache system, the first data is written in the volatile cache memory, when the second piece of data is stored in the volatile cache memory based on a read request, the second piece of data is read from the volatile cache memory, and when the second piece of data is only stored in the nonvolatile cache memory based on the read request, the second piece of data is read from the nonvolatile cache memory; and wherein the processor element performs an operation using data to be outputted from the cache system.

9. The processing apparatus according to claim 8, wherein the second LRU memory stores, in association with each piece of the data stored in the nonvolatile cache memory, LRU data showing the order of lengths of the periods of time that the data has been unused, the order being among the data corresponding to a number of ways stored in the same line of the nonvolatile cache memory; and the processing apparatus further comprises an LRU update unit to update the LRU memory using the sequence data stored in the sequence storage in association with the first piece of data, when the controller causes the first piece of data to be stored in the nonvolatile cache memory.

10. The processing apparatus according to claim 9, further comprising an update processing unit to update, when any piece of the data in the nonvolatile cache memory is used, the sequence data of the sequence storage by using LRU data stored in the second LRU memory in association with the piece of data.

11. The processing apparatus according to claim 8, wherein the controller causes the first piece of data to be stored not in the nonvolatile cache memory but in an upper storage device when the first piece of data stored in the volatile cache memory is overwritten by the second piece of data having another address or when power of the volatile cache memory is turned off, in a case where it is determinable based on the sequence data stored in the sequence storage in association with the first piece of data that the first piece of data has been unused for a longer period of time than all pieces of the data stored in the nonvolatile cache memory.

12. The processing apparatus according to claim 8, further comprising an already-copied storage to store copy information showing whether data identical to each piece of data in the volatile cache memory has been stored in the nonvolatile cache memory, in association with the piece of the data, wherein the controller causes the first piece of data to be stored in the nonvolatile cache memory when the first piece of data stored in the volatile cache memory is overwritten by second piece of data having another address or when power of the volatile cache memory is turned off, in a case where copy information has been stored which shows that data identical to the first piece of data has not been stored in the nonvolatile cache memory, in association with the first piece of data, when it is determinable based on the sequence data stored in the sequence storage in association with the first piece of data that the first piece of data has been unused for a shorter period of time than any pieces of the data stored in the nonvolatile cache memory.

13. The processing apparatus according to claim 8, wherein a number of lines of the volatile cache memory and a number of lines of the nonvolatile cache memory are equal to each other.

14. The processing apparatus according to claim 8, wherein the nonvolatile cache memory is a magnetoresistive memory.

* * * * *